United States Patent
Hyman et al.

(10) Patent No.: US 9,591,088 B2
(45) Date of Patent: *Mar. 7, 2017

(54) METHOD AND SYSTEM FOR COLLECTING AND PROVIDING APPLICATION USAGE ANALYTICS

(71) Applicant: Appboy, Inc., New York, NY (US)

(72) Inventors: Jonathan Hyman, New York, NY (US); William Magnuson, New York, NY (US)

(73) Assignee: Appboy, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/997,957

(22) Filed: Jan. 18, 2016

(65) Prior Publication Data

US 2016/0134716 A1   May 12, 2016

Related U.S. Application Data

(63) Continuation of application No. 13/556,937, filed on Jul. 24, 2012, now Pat. No. 9,239,771.

(51) Int. Cl.
| | |
|---|---|
| *H04L 29/08* | (2006.01) |
| *G06Q 30/02* | (2012.01) |
| *G06Q 50/00* | (2012.01) |
| *H04W 4/00* | (2009.01) |
| *G06F 11/30* | (2006.01) |
| *G06F 11/34* | (2006.01) |

(52) U.S. Cl.
CPC .......... *H04L 67/22* (2013.01); *G06F 11/3003* (2013.01); *G06Q 30/02* (2013.01); *G06Q 30/0201* (2013.01); *G06Q 50/01* (2013.01); *H04L 67/306* (2013.01); *H04W 4/003* (2013.01); *G06F 11/3065* (2013.01); *G06F 11/3438* (2013.01); *G06F 2201/865* (2013.01)

(58) Field of Classification Search
None
See application file for complete search history.

(56) References Cited

U.S. PATENT DOCUMENTS

| | | |
|---|---|---|
| 8,484,241 B2 | 7/2013 | Bouse et al. |
| 8,732,697 B2 | 5/2014 | Jonnala et al. |
| 8,799,365 B2 | 8/2014 | Ren |

(Continued)

OTHER PUBLICATIONS

Empson et al., "Appboy Raises A Cool Million To Let App Developers Better Engage and Understand Their User Bases"; Nov. 23, 2011; [retrieved on Jan. 24, 2014]; Retrieved from the internet: <URL: http://techcrunch.com/2011/11/23/appboy-raises-a-cool-million-to-let-app-develpers-bettter-engage-and-understand-their-user-base>; entire document—seven (7) pages.

(Continued)

*Primary Examiner* — Greg C Bengzon
(74) *Attorney, Agent, or Firm* — Lowenstein Sandler LLP

(57) ABSTRACT

Methods and systems for collecting and analyzing application usage are disclosed. A usage analytics module is integrated within an application. The application is deployed to a device. Usage analytics are received, at a server, in response to usage of the application at the device. The usage analytics are provided to the developer, wherein the usage analytics includes at least one of: information identifying a user of the application or information linking the usage analytics to an existing user identity.

15 Claims, 20 Drawing Sheets

(56) References Cited

U.S. PATENT DOCUMENTS

| | | |
|---|---|---|
| 8,806,225 B2 | 8/2014 | Park et al. |
| 8,869,256 B2 | 10/2014 | Sample et al. |
| 2004/0243539 A1 | 12/2004 | Skurtovich, Jr. et al. |
| 2008/0172458 A1 | 7/2008 | Middleton et al. |
| 2009/0177744 A1 | 7/2009 | Marlow et al. |
| 2009/0193083 A1 | 7/2009 | Rea et al. |
| 2009/0248883 A1 | 10/2009 | Suryanarayana et al. |
| 2010/0023874 A1 | 1/2010 | Frohwein |
| 2010/0049852 A1* | 2/2010 | Whitnah ............ G06Q 10/10 709/226 |
| 2010/0121744 A1* | 5/2010 | Belz ................ H04M 15/00 705/30 |
| 2010/0157989 A1 | 6/2010 | Krzyzanowski et al. |
| 2010/0312820 A1 | 12/2010 | Goffinet et al. |
| 2011/0022444 A1 | 1/2011 | Fridman et al. |
| 2011/0145920 A1* | 6/2011 | Mahaffey ............ G06F 21/564 726/22 |
| 2011/0264663 A1* | 10/2011 | Verkasalo ......... G06F 17/30867 707/740 |
| 2011/0282893 A1 | 11/2011 | Dolin et al. |
| 2012/0022915 A1 | 1/2012 | Carion et al. |
| 2012/0036018 A1 | 2/2012 | Feliciano et al. |
| 2012/0054661 A1 | 3/2012 | Rados et al. |
| 2012/0143677 A1 | 6/2012 | Bruno et al. |
| 2012/0260232 A1* | 10/2012 | Hirsch ................ G06F 8/20 717/107 |
| 2012/0290610 A1 | 11/2012 | Hoang |
| 2012/0303425 A1 | 11/2012 | Katzin et al. |
| 2012/0317266 A1 | 12/2012 | Abbott |
| 2012/0323686 A1 | 12/2012 | Burger et al. |
| 2012/0324359 A1* | 12/2012 | Lee ................ G06F 11/3438 715/733 |
| 2013/0013691 A1* | 1/2013 | Whitnah ............ G06Q 10/10 709/204 |
| 2013/0019237 A1 | 1/2013 | Pardehpoosh et al. |
| 2013/0080521 A1 | 3/2013 | Souza et al. |
| 2013/0097008 A1 | 4/2013 | Kaniel |
| 2013/0117208 A1* | 5/2013 | Dousse ............ G06Q 30/0202 706/21 |
| 2013/0124315 A1 | 5/2013 | Doughty et al. |
| 2013/0167207 A1 | 6/2013 | Davis et al. |
| 2013/0203433 A1* | 8/2013 | Luna ................ H04W 28/06 455/452.1 |
| 2013/0247005 A1* | 9/2013 | Hirsch ................ G06F 8/71 717/121 |
| 2013/0262392 A1 | 10/2013 | Vibhor et al. |
| 2013/0267250 A1 | 10/2013 | Lin et al. |
| 2013/0290149 A1 | 10/2013 | Rashwan |
| 2013/0303113 A1 | 11/2013 | Kumar et al. |
| 2013/0305218 A1* | 11/2013 | Hirsch ................ G06F 8/36 717/106 |
| 2013/0316703 A1* | 11/2013 | Girard ............ G06Q 20/145 455/432.1 |
| 2013/0325856 A1* | 12/2013 | Soto Matamala .. G06F 17/3089 707/724 |
| 2013/0326476 A1 | 12/2013 | Wyatt et al. |
| 2013/0346917 A1* | 12/2013 | Bragdon ............ G06F 11/3419 715/802 |
| 2014/0019228 A1 | 1/2014 | Aggarwal et al. |
| 2014/0026113 A1* | 1/2014 | Farooqi ................ G06F 8/36 717/107 |
| 2014/0115506 A1* | 4/2014 | George ................ G06Q 10/06 715/764 |
| 2014/0289314 A1 | 9/2014 | Dare et al. |
| 2014/0351343 A1* | 11/2014 | Whitnah ............ G06Q 10/10 709/204 |
| 2015/0039756 A1* | 2/2015 | Agarwal ............ H04L 12/141 709/224 |
| 2015/0135160 A1* | 5/2015 | Gauvin ............ H04W 4/001 717/109 |
| 2015/0200815 A1* | 7/2015 | Verkasalo ......... G06F 17/30867 707/740 |

OTHER PUBLICATIONS

Empson et al., "With Another $1.5M, Appboy Launches App Management Platform, Hootsuite CEO Joins Board", Mar. 26, 2012 [retrieved on Jan. 24, 2014]; Retrieved from the internet: <URL:http://techcrunch.com/2012/03/26/appboy-seed-launch/>; entire document—six (6) pages.

Google Developers Analytics Collection, downloaded from https://developers.google.com/analytics/devguides/collection/ on May 11, 2013, 7 pages.

Industry-Leading App Analytics for Free, Flurry Analytics, downloaded from http://www.flurry.com/flurry-analytics.html on Dec. 6, 2012, 6 pages.

International Search Report and Written Opinion corresponding to PCT/US2013/051768 dated Feb. 11, 2014.

iPhoneDevSDK; "Does Anyone Use Appboy?"; Jun. 13, 2012; [retrieved on Jan. 24, 2014]; Retrieved from the Internet: <URL: http://iphonedevsdk.com/forum/promotion-techniques/104948-does-anyone-use-appboy.html>; entire document—six (6) pages.

Mixpanel people analytics for iPhone, downloaded from https://mixpanel.com/docs/people-analytics/iphone on Dec. 6, 2012, 3 pages.

Squiz Analytics Sneak Peak—the Dashboard; Aug. 30 2010; [retrieved on Jan. 24, 2014]; Retrieved from the Internet: <URL: http://www.squizlabs.com/squiz-analytics/sneak-peek-dashboard]; entire document—four (4) pages.

Taori, et al., "Application Performance Management With Oracle Enterprise Manager 11g"; Apr. 2010; [retrieved on Jan. 24, 2014]; Retrieved from the internet: <URL: http://www.oracle.com/technetwork/oem/app-mgmt/twp-apm-em-175919.pdf; entire document—twenty-one (21) pages.

\* cited by examiner

FIG. 6a

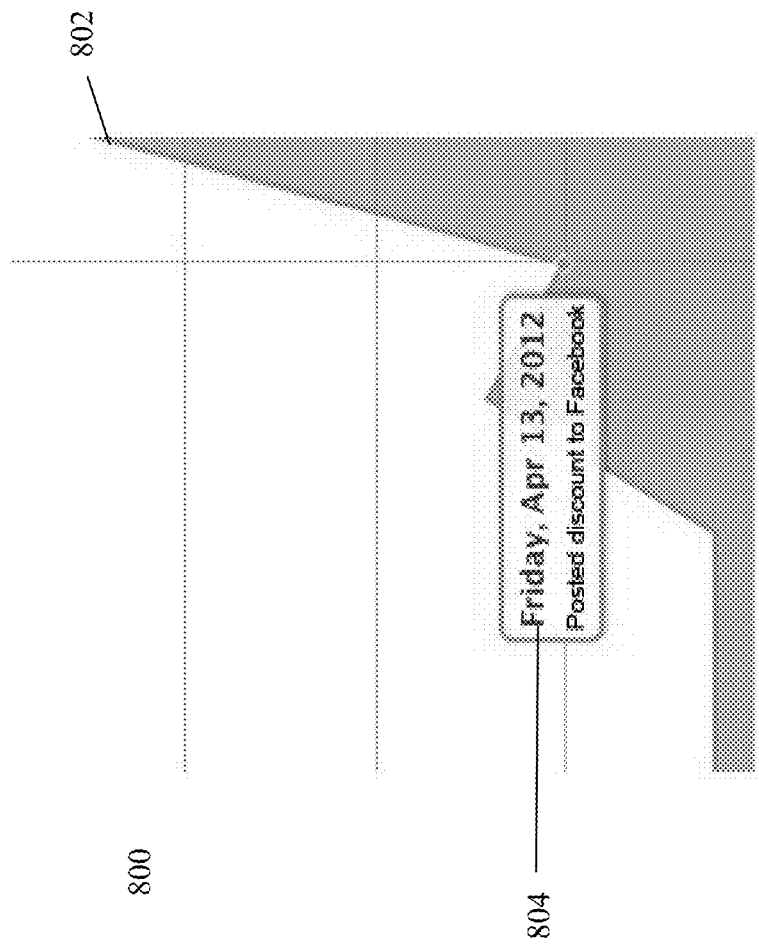

METHOD AND SYSTEM FOR COLLECTING AND PROVIDING APPLICATION USAGE ANALYTICS

CROSS REFERENCE TO RELATED APPLICATIONS

The present application is a continuation of U.S. Non-provisional application Ser. No. 13/556,937 filed 24 Jul. 2012; which is incorporated herein by reference in its entirety.

FIELD

The present disclosure relates to methods and systems for collecting and analyzing application usage analytics. More particularly, the present disclosure relates to a module that may be integrated with an application in order to collect usage data regarding application usage, that is related to a user identity, as well as serve and host content.

BACKGROUND OF THE INVENTION

Recent advancements in technology have resulted in increased usage of mobile applications. As a result, developers are increasingly reliant on information regarding how their applications are used, the demographic of the application users, and other information regarding application use. Different tools may be used in conjunction with a mobile application and executing separately to assist developers. However, these solutions may not be optimal. For example, analytic usage information with respect to mobile applications do not tie into a user's actual identity and other details which may reveal more about the user and how they use the application, and what their true preferences are. Several services provide passive analytics collection such as receiving information about device type, time of usage, location usage, feature usage, and event reporting. However, none of these solutions process or utilize information relating to a user's identity.

SUMMARY

The embodiments described herein relate to methods and systems for collecting and analyzing application usage.

In an embodiment, a method for analyzing application usage is disclosed. A usage analytics module is integrated within an application. The application is deployed to a device. Usage analytics are received, at a server, in response to usage of the application at the device. The usage analytics are provided to the developer, wherein the usage analytics include information identifying a user of the application or linking the usage analytics to an existing user identity.

In an embodiment, a system for analyzing application usage is disclosed. An integration unit is configured for integrating a usage analytics module within an application. A deployment unit is configured for deploying the application to a device. A usage analytics unit is configured for receiving usage analytics in response to usage of the application at the device. A developer dashboard unit is configured for providing the usage analytics to the developer, wherein the usage analytics include information identifying a user of the application or linking the usage analytics to an existing user identity.

In an embodiment, a machine readable non-transitory and tangible medium having information recorded for analyzing usage is disclosed. The information, when read by the machine, causes the machine to perform the steps comprising: integrating a usage analytics module within an application; deploying the application to a device; receiving usage analytics, at a server, in response to usage of the application at the device; and providing the usage analytics to the developer, wherein the usage analytics include information identifying a user of the application or linking the usage analytics to an existing user identity.

In an embodiment, integrating a usage analytics module within an application may comprise integrating the usage analytics module into source code of the application.

In an embodiment, deploying the application to a device may comprise deploying the application to a device via a mobile application store.

In an embodiment, deploying the application to a device may comprise deploying the application to a mobile device.

In an embodiment, receiving usage analytics in response to usage of the application at the device may comprise collecting usage analytics regarding at least one of: usage of the application by at least one user of the device, interfacing of the application with the device, and details regarding the device.

In an embodiment, receiving usage analytics in response to usage of the application at the device may comprise collecting user feedback from a user of the device.

In an embodiment, at least one of: hyperlinked content or product announcements may be provided to the device via the application.

In an embodiment, an interface for a user of the application may be provided to integrate the application with at least one social network associated with the user. The at least one social network associated with the user may be linked to an internal profile associated with the user. Information received from the at least one social network may be augmented with the internal profile.

In an embodiment, receiving usage analytics in response to usage of the application at the device may comprise collecting usage analytics passively. Collecting usage analytics passively may comprise receiving information about a user of the application in response to the application being executed; and adding the information about the user to an internal profile associated with the user.

In an embodiment, providing the usage analytics to the developer comprises providing a developer dashboard for presenting the usage analytics to the developer. The usage analytics may be formatted for display in a graphical form, and the usage analytics may be displayed in graphical form within the developer dashboard.

In an embodiment, at least one social network associated with the user may be linked to an internal profile associated with the user based on a received identity key associated with the user. Information received from the at least one social network may be augmented with the internal profile.

Additional advantages and novel features will be set forth in part in the description which follows, and in part will become apparent to those skilled in the art upon examination of the following and the accompanying drawings or may be learned by production or operation of the disclosed embodiments. The advantages of the present embodiments may be realized and attained by practice or use of various aspects of the methodologies, instrumentalities and combinations set forth in the detailed description set forth below.

BRIEF DESCRIPTION OF THE DRAWINGS

The exemplary embodiments described herein may be described in detail with reference to the drawings. These embodiments are non-limiting exemplary embodiments, in which like reference numerals represent similar structures throughout the several views of the drawings.

FIGS. 6A-6D depict exemplary displays of developer dashboard displays, in accordance with an embodiment of the present disclosure.

FIG. 8 depicts an exemplary graph that may be presented through the developer dashboard, in accordance with an embodiment of the present disclosure.

DETAILED DESCRIPTION

Figure 1:
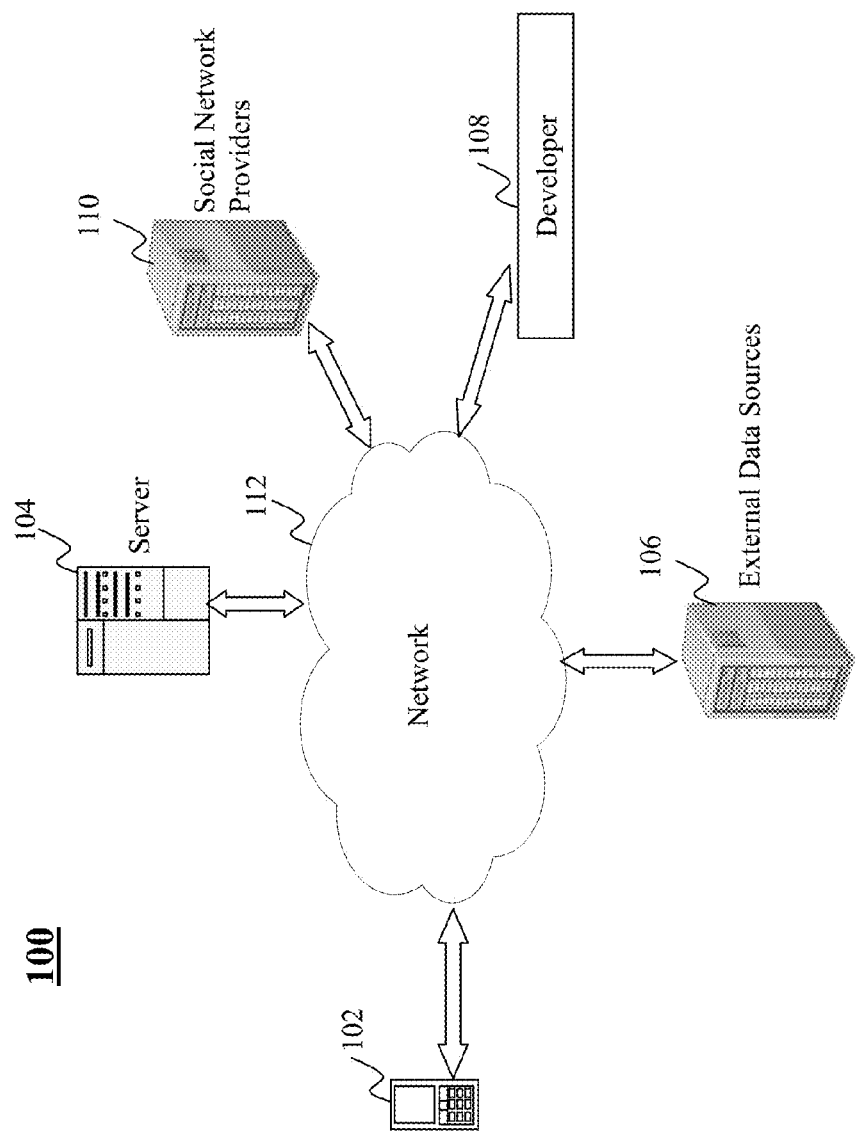
FIG. 1 depicts an exemplary system for collecting and analyzing usage analytics of applications, and providing usage analytics to developers, in accordance with an embodiment of the present disclosure.

The present disclosure and embodiments described herein provide a system that associates mobile device application usage analytics with publicly and privately available information to create composite user profiles. Mobile application usage analytics may be defined as a quantitative measurement of specific actions taken by users within a mobile application and the circumstances under which those actions are taken. A usage analytics module may be integrated directly within a host application source code. After the host application is deployed and executed by a user, the usage analytics module collects information regarding how the application is being used by the user, for example, the number of times the application has been used. The usage analytics module may compile this information or usage analytics and provide it to the developer of the application. Additionally, a developer dashboard may be provided to developers to access the usage analytics and view the usage analytics in order to help the developer further develop their application.

Some further examples of mobile application usage analytics are discussed below. Passive usage data may include device and software details related to the device (version information or capability information of the device or software), the location of the usage, as well as amount of time spent by a user in a particular application. The passive usage data may be cumulative to represent data for total usage of an application, or discrete for each time a user initiates use of an application.

Specific statistics on usage of particular application features may also be collected and analyzed. This includes, for example, how a user engages with promotional material presented within an application, purchases initiated from within the application and completed in an external market, sharing activity on social networks, consumption and following of links to news, submitting feedback and technical support questions to application developers, as well as sharing profile and demographic information. Additionally, data regarding custom activities and feature usage particular to the application may be collected as well.

Data related to follow-on activities may also be collected. This includes results of the usage of particular features, including the impact (measurable by eventual purchase of an item) or participation in social media such as promoting an item or sharing an activity on social networks. Follow-on activities may thus include activities both by the user initiating a tracked activity or their audience. For example, if a user shares or tweets about an application through their Twitter account, and one of that user's followers subsequently downloads the application, the follower may build their own user profile facilitating collection of usage analytics. When usage analytics are eventually collected with regard to the follower, data on the trail of activity leading to the follower's download and installation of the application can also be retrieved.

As will be discussed further within the present disclosure, the embodiments described herein also provide authenticated social network identities in the form of a social network profile that a mobile application user may authenticate from within a mobile application. Composite user profiles may also be associated with users. Information may be gathered and compiled about a particular user based on available information tied to a user's existing social network identities as well as other external data sources including personalized content based on shopping history, social network influence indicators, net worth or household size estimates, and educational background.

FIG. 1 depicts an exemplary system for collecting and analyzing usage analytics of applications, and providing usage analytics to developers, in accordance with an embodiment of the present disclosure. System 100 as shown, includes a user device 102, server 104, external data sources 106, developer 108, and social network providers 110. Communication may take place over network 112. While only one user device, server, and developer are shown, it is understood that the system may comprise a plurality of user devices, servers, and developers. Furthermore, a user device may include mobile devices such as mobile phones, smartphones, tablets, laptops, as well as traditional computing devices such as desktop computers. A user device may also comprise any device capable of downloading applications and thus may be inclusive of vehicles or other equipment or apparatus supporting the download and execution of applications through a user interface.

As described above, a usage analytics module may be integrated directly into a host application's source code. In order to facilitate integration of the usage analytics module, a developer 108 may access a server 104 over network 112. For example, developer 108 may transmit an application to server 104. Once the application is received by server 104, server 104 will integrate a usage analytics module into the application. The usage analytics module may also be provided by server 104 to developer 108 to perform the integration. Once integrated, the usage analytics module becomes a part of the application. Thus, whenever the application is executed by, for example, a user of a user device 102, the usage analytics module collects usage analytics regarding application usage such as how many times the application has been opened or executed.

Furthermore, the usage analytics module provides built-in features for both developers and users, including allowing a developer to push hyperlinked content and product announcements into the application, a feedback interface for users to contact the developer regarding the application, and incentives for users to share any content from the application on the users' social networks.

Additionally, when developer 108 accesses server 104, server 104 may provide the usage analytics that have been collected to developer 108. Provision of the usage analytics may be through a developer dashboard interface allowing developer 108 to view the usage analytics, including feedback form users, and statistics regarding the users use of applications. The developer dashboard interface furthermore allows developer 108, via server 104, to pull or push hyperlinked content and product announcements into the application, without requiring developer 108 to reprogram the application.

Once the usage analytics module is integrated into the application, the application may be deployed to a device. Deployment of the application may take place either from server 104, or from a developer 108. Additionally, the application may be deployed to an external data source 106, for example, an application store or web site that allows a user of user device 102 to purchase and/or download the application.

After the application is installed on user device 102, the usage analytics module of the application will activate each time the application is opened or executed or run. Once the usage analytics module of the application is activated, usage analytics are collected based on usage of the application at user device 102. The usage analytics, as mentioned above, may include information related to usage of the application, interfacing of the application with the user device 102, and details regarding the user device 102. As mentioned above, user feedback is also collected as part of the usage analytics.

Hyperlinked content or product announcements may additionally be provided to the usage analytics module of user device 102 from external data sources 106. This content may be provided at the request of developer 108. Once received, the content will be displayed on user device 102 through the application.

The usage analytics module furthermore provides an interface thru the application, where a user of user device 102 may integrate or associate the application with their social networks. Linking of the social networks may be performed by transmitting an instruction from user device 102 through network 112, to social network providers 110 to link the application to the particular social network. Additionally, internal user profiles may be stored at server 104. Thus, the linked social networks may also be linked to the internal user profiles. As a result, any information received from or transmitted to the social networks from the application may be augmented to any other information in the internal user profiles. The internal user profiles may be established at the discretion of a user of user device 102. The usage analytics module may prompt a user with instructions to establish an internal user profile. Once established, various usage analytics may be associated with the user profile to further assist developers in developing their application and ascertaining information regarding usage of their application.

FIGS. 2A-2E depict exemplary screenshots of an application including an integrated usage analytics module, in accordance with an embodiment of the present disclosure. At a user device, such as user device 102, an application including an integrated usage analytics module is received. When the application is executed, a user may be presented with the screenshot shown by FIG. 2A. Screenshot 202 depicts the application name 204 via a message displayed on screenshot 202. An icon 205 allows a user to log into their Facebook account. Logging into the Facebook account would result in the identity key of the user being transmitted to server 104. Logging into Facebook also, to the extent offered by the application, facilitates integration of features of the application (Econometrics) with features of Facebook. An icon 206 allows a user to log out of their Facebook account, thus disassociating Facebook with the application. While logging out results in a disassociation of Facebook with the application (until the user chooses or elects to log in again), this does not affect the ability of the integrated usage analytics module to transmit the identity key of the user with respect to their Facebook account. The identity key is transmitted to server 104, and thus information relating to the user's identity that can be retrieved from Facebook will be associated with the user of the application at server 104. While logging into and out of Facebook is described with respect to FIG. 2A, one of reasonable skill in the art would contemplate that other social network accounts, or similar accounts may replace Facebook.

Icon 207 allows a user to navigate to a news section. Icon 208 allows a user to contact the developers, via the usage analytics module. This will allow users to submit feedback via the usage analytics module to server 104, where the feedback may be later retrieved by a developer through a developer dashboard, discussed in greater detail below. Icon 209 allows a user to navigate to a section of the application where they can view or download other applications. Share icon 203 allows a user to share their usage of the application, a link to download of the application, or a feature of the application through an associated social network such as Facebook. When selected, an indication of the sharing may be collected by the usage analytics module, which transmits this information to server 104.

Figure 2A:
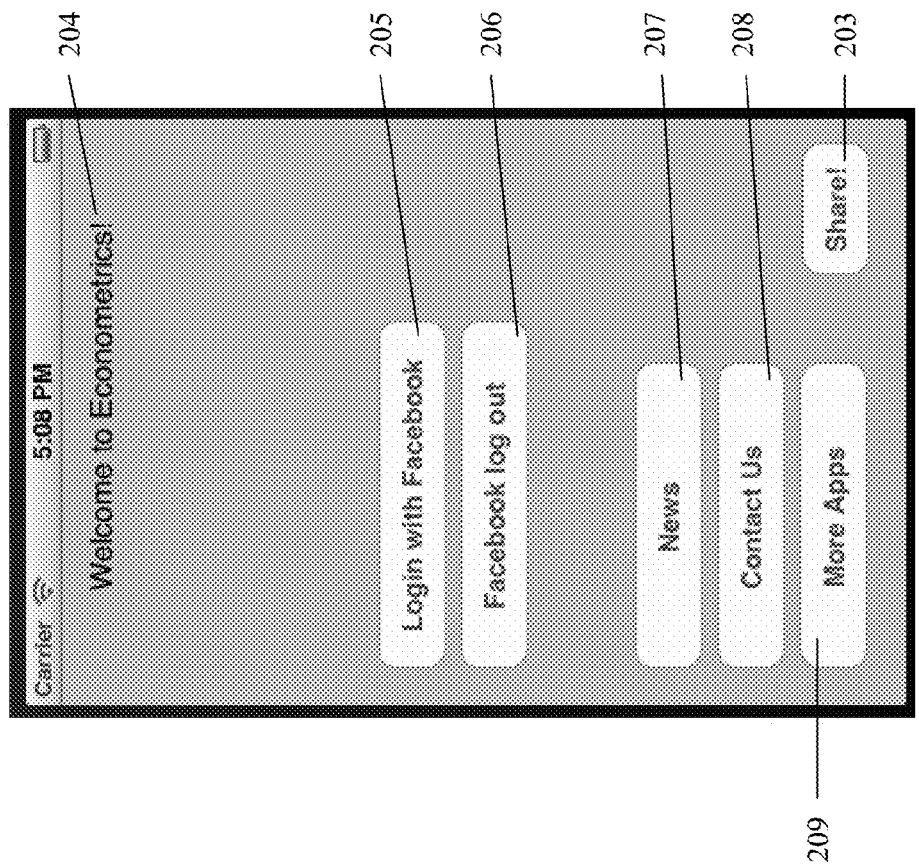
FIGS. 2A-2E depict exemplary screenshots of an application including an integrated usage analytics module, in accordance with an embodiment of the present disclosure.
Figure 2B:
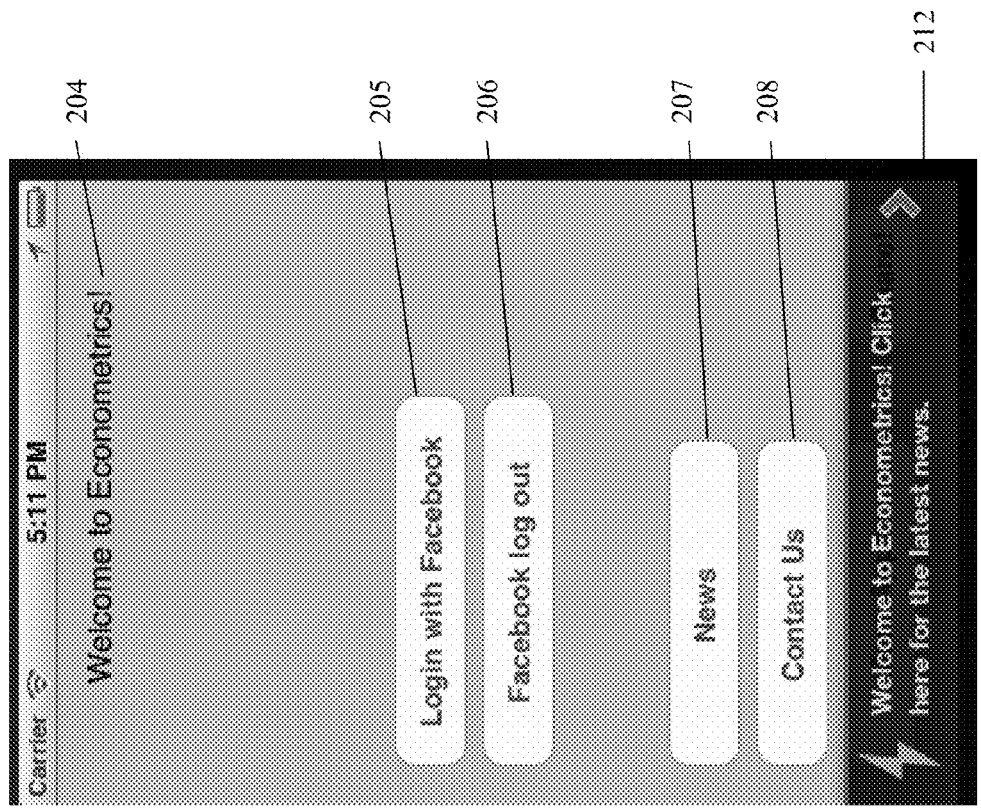

FIG. 2B displays a screenshot 210 that is similar to screenshot 202 of FIG. 2A. Many of the same icons are present. However, screenshot 210 includes a slide up 212, which, when activated, may navigate the user to a location where usage analytics may be collected and transmitted to server 104.

Figure 2C:
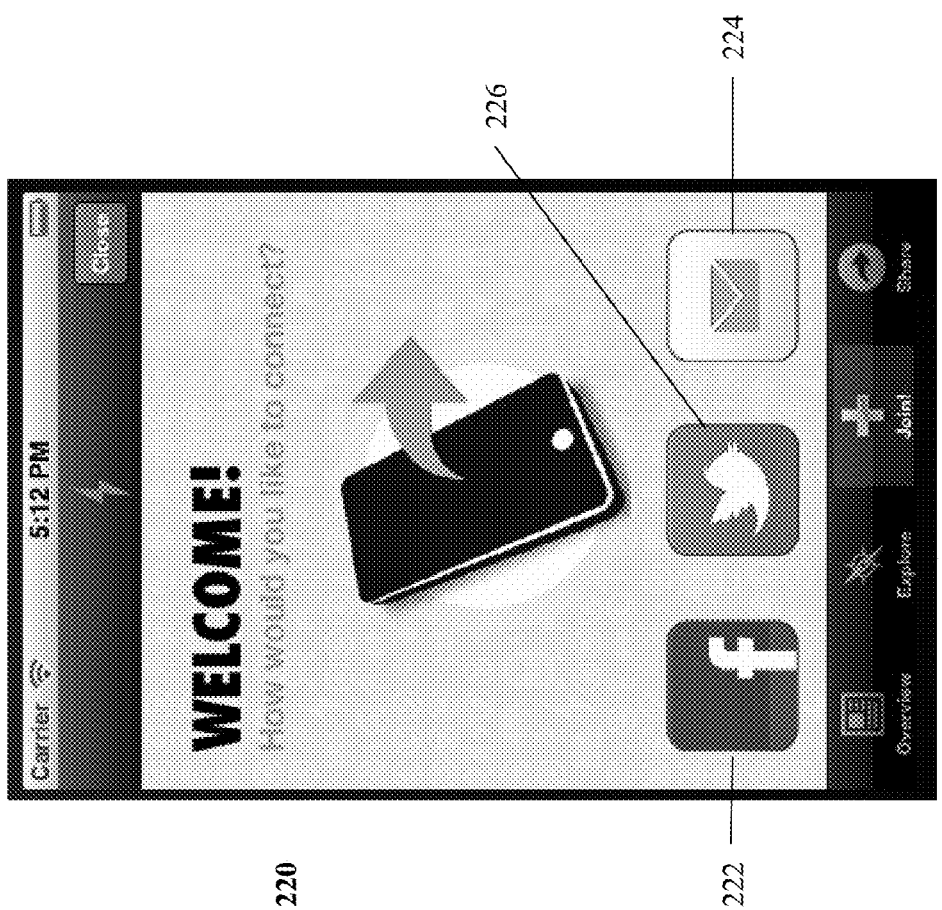

FIG. 2C shows a screenshot 220 allowing a user of user device 102 to link their social network and external accounts, such as Facebook, Twitter, and e-mail to the application through the usage analytics module. Icon 222 allows a user to link Facebook to the application through the usage analytics module. Icon 224 allows a user to link their e-mail to the application through the usage analytics module. Icon 226 allows a user to link their Twitter account to the application through the usage analytics module. Linking any of the social network or external accounts will result in an identity key associated with that account being transmitted to server 104 via the usage analytics module. Each individual identity key establishes that a user has an account with the particular social network or external account. Multiple linking of social network and external accounts through the application may result in the identity keys being associated with one another, and thus identifying a user of all of the social network and external accounts as a single entity. Further details with regard to identity keys and association of identity keys is described below.

Figure 2D:
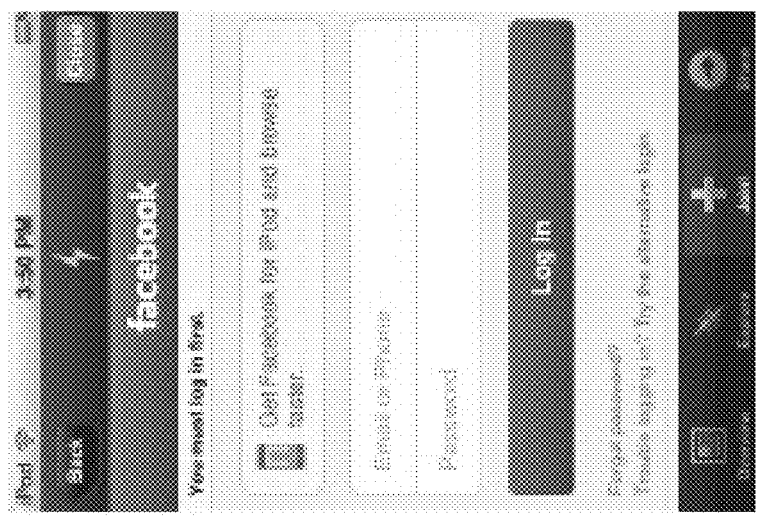

FIG. 2D shows a screenshot 230 allowing a user to log in to the user's Facebook account and thereby link the user's Facebook account with the application through the usage analytics module.

Figure 2E:
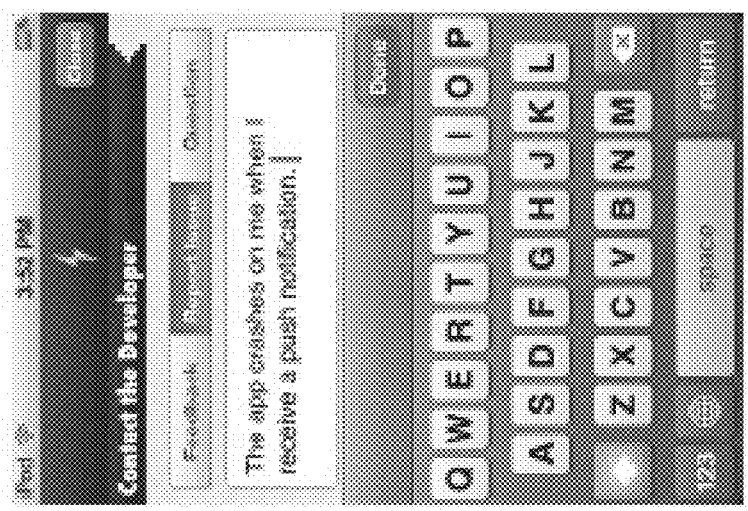

FIG. 2E shows a screenshot 240 where a user of user device 102 may interact with developer 108 of the application through the usage analytics module of the application. Selection of a feedback option associated with icon 242 allows a user to enter feedback regarding the application and transmit it to server 104, where it can later be accessed by developer 108. Similarly, selection of a report issue option associated with icon 244 allows a user to report problems or issues with the application to server 104, where the reported problems or issues can be accessed by developer 108. Selection of a question icon 246 allows a user to enter any other question regarding the application to server 104, where it can later be accessed by developer 108. The usage analytics module of the application may further allow a user to read content sent from developer 108 to user device 102.

Figure 3:
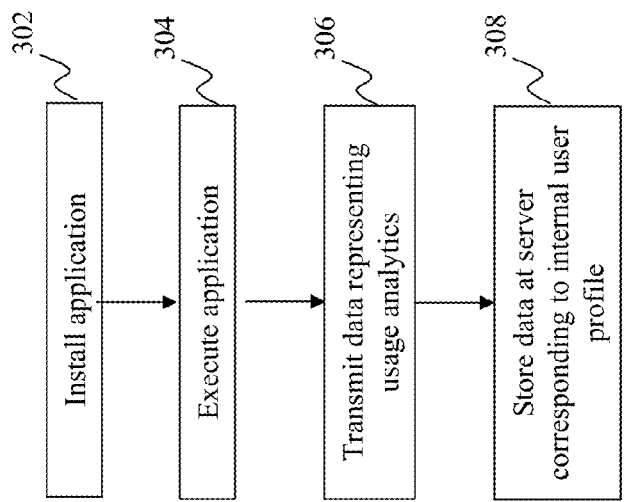
FIG. 3 illustrates an exemplary process for initiating data collection in accordance with an embodiment of the present disclosure.

FIG. 3 illustrates an exemplary process for initiating data collection in accordance with an embodiment of the present disclosure. At 302, a user may choose to download or install an application including an integrated usage analytics module, as described above. The application may be downloaded or installed from a third party application, directly from a developer 108, directly from a server 104, or via any other source for deploying applications.

Once the application is installed and resident on a user device 102, the application is opened or executed, at 304. Execution of the application initiates a process for collection of data.

At 306, the user device, through the application, may transmit a payload or data representing usage analytics that includes information regarding the user, the application, and other relevant usage information as described previously. Information regarding the user may be obtained from the user directly through forms filled out by the user, through user data obtained from user device 102, or through user data obtained from any social networks or external accounts that the user has decided to link with the application. Information regarding the application is collected based on events occurring within the application. An event may comprise at least the following: starting the application, closing the application, initiating a function of the application, initiating a function causing an error in the application. Usage information can include usage of particular features of the application, results of that usage, location data of where the application is used, as well as data related to social network integration of the application. Usage analytics may alternatively be furnished directly from the application developer.

More specifically, when an application is first executed, the application communicates via user device 102 with server 104 to establish a unique identifier for the installed instance of the application. This ensures that any usage analytics generated via usage of the application on user device 102 is correctly attributed to the installed instance.

Subsequently, each time an application is executed, a payload or data representing usage analytics is transmitted from user device 102 to server 104 using a data transfer protocol such as a Representational State Transfer (REST) interface via Hypertext Transfer Protocol Secure (HTTPS). Based on the unique identifier established at server 104, user device 102 may transmit all data from a particular application usage session (the time starting from when an application is opened until the time an application is closed or the time when another application causes the application to close) to server 104. Examples of the data may include which icons or buttons are selected or clicked by a user, how long a user uses a particular feature of the application, feedback transmitted from a user to a developer, and location information regarding the user.

At the option of a developer 108, the usage analytics module may also facilitate collection of data relating to how much money a user has spent with regard to purchases made or transactions enacted within the application.

At 308, upon receipt of the data, the data is stored at server 108, and associated with a user internal profile corresponding to a user of user device 102. Once the data is stored, the data may be later retrieved by developer 108.

Figure 4:
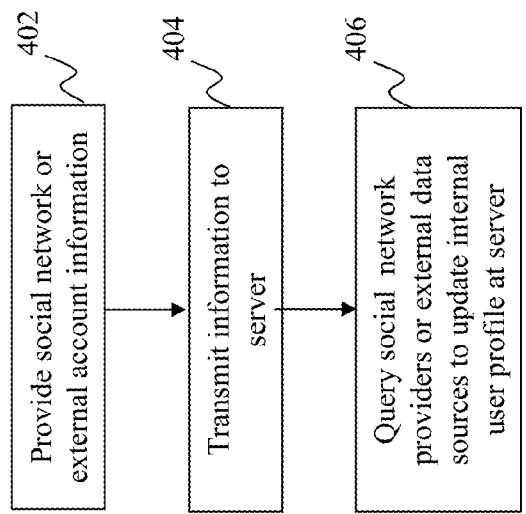
FIG. 4 illustrates an exemplary process for user identity association and collection of data from external sources, in accordance with an embodiment of the present disclosure.

FIG. 4 illustrates an exemplary process for user identity association and collection of data from external sources, in accordance with an embodiment of the present disclosure. As discussed above, users may link their social network or external accounts within an application integrated with a usage analytics module. Additionally, users may enter their social network or external account information within the application, and the application, thru the usage analytics module, can provide the identifiable social network or external account information of the user to server 104.

At 402, user device 102 provides social network or external account information of a user to server 104.

At 404, server 104 receives the information transmitted from user device 102 and associates this information with an internal user profile corresponding to the user.

At 406, server 104 queries social network providers 110 or external data sources 106 in order to retrieve additional information to update the internal user profile. This may include augmenting the internal user profile with additional information retrieved from social networks or external accounts that the user may belong to. This augmentation may occur at regularly scheduled intervals. Information may be obtained from any of the social network or external accounts and may include public and private information sources. Public sources may include general publicly available information such as public Twitter feeds, LinkedIn information, or Hunch taste graph recommendations. Private sources may include Facebook and private Twitter profile information. Private sources may also include data feeds or aggregated data purchased from third party sources.

To facilitate retrieval of additional information to update the internal user profile, server 104 may receive an identity key allowing server 104 to index and retrieve the additional information. For example, when a user of an application decides to link one of their social networks or external accounts, such as Twitter, Facebook, Google+, etc., there is an identity key associated with each of their accounts for each respective social network or external account. The identity keys may be social network identifiers such as usernames or IDs, email addresses, social network connections/authentication tokens, first/last name of the user. Once an identity key is determined, that identity key may be used to further identify the particular user, when, for example, the user uses the application from another device, as well as to query other social networks and external data sources that may identify the user using the same identity key. These other sources may be, for example, other social networks, or external sources such as Klout.com and Hunch.com. When the same user is identified across networks, further information about the user can be retrieved, to enhance the internal user profile, and to assist in identifying the user across multiple devices, social networks, accounts, data sources and sites.

For example, a user may use an application which includes an integrated usage analytics module. The user may link their Facebook account to the application. Linking of the Facebook account allows the usage analytics module to determine the user's identity key with respect to Facebook (Facebook username). This identity key may be transmitted to server 104. Server 104 may subsequently use the identity key and query other social networks or external data sources to see if there are accounts associated with the same identity key. If there are, then data from these other accounts are all considered associated with the original user in the internal user profile for the user stored at server 104. Data from the other accounts may also be extracted and added as additional content to the internal user profile.

Figure 5:
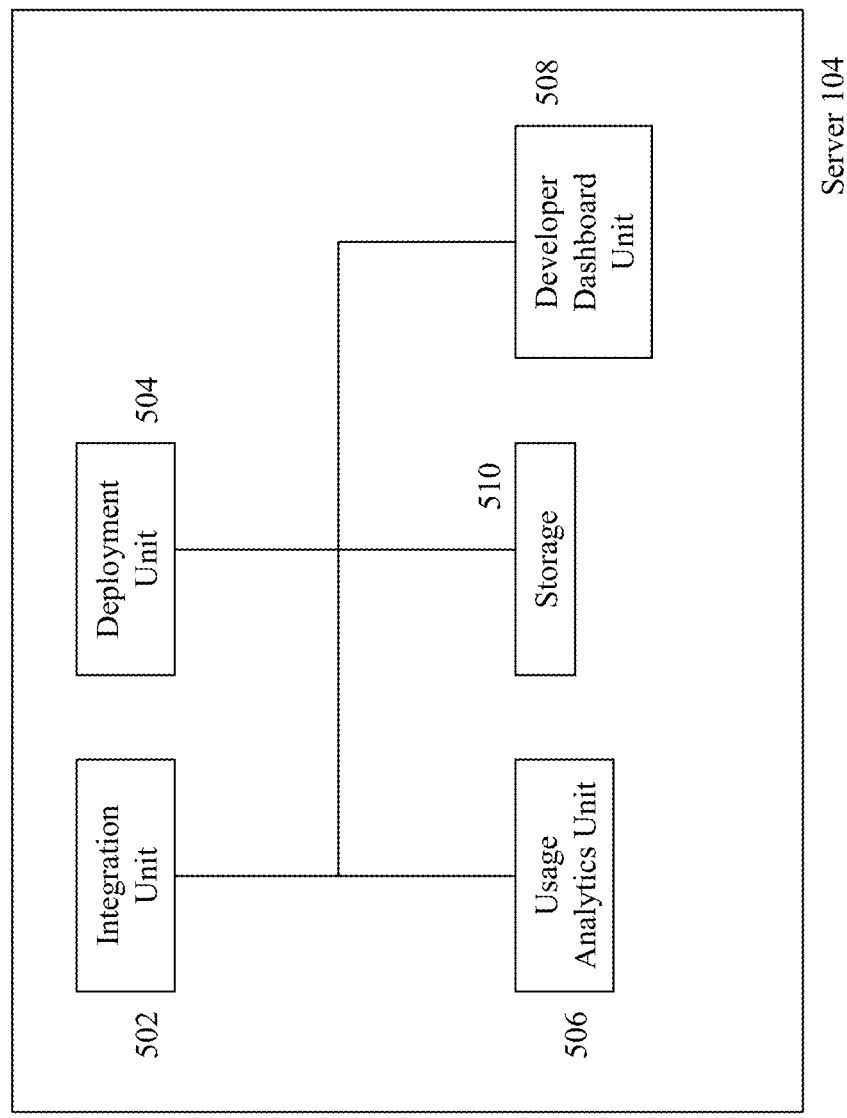
FIG. 5 illustrates a server for interacting with a user device and developer, in accordance with an embodiment of the present disclosure.

FIG. 5 illustrates a server for interacting with a user device and developer, in accordance with an embodiment of the present disclosure. Server 104, as shown, includes an integration unit 502, a deployment unit 504, a usage analytics unit 506, and a developer dashboard unit 508. Integration unit 502 facilitates integration of a usage analytics module to an application provided by a developer. As discussed above, developer 108 may utilize server 104, and specifically integration unit 502 to integrate a usage analytics module into their application, thus allowing the application to collect usage analytics once deployed and provide these usage analytics to server 104, such that the developer 108 may access these usage analytics. Integration is performed by inserting or integrating the usage analytics module within the source code of the application such that the usage analytics module becomes a part of the application.

Integration may also take place apart from server 104. Server 104 may instead provide the usage analytics module to a developer. Developer 108 may access developer dashboard unit 508, which may retrieve the usage analytics module from integration unit 502. The usage analytics module is then provided to developer 508, who may integrate the usage analytics module within their application.

The application may then be deployed by deployment unit 504. Deployment may be direct to a mobile device or user device 102, or to a device via a mobile application store.

Once the application is installed on user device 102, the usage analytics module will cause user device 102 to transmit usage analytics which will be collected by usage analytics unit 506 in response to usage of the application at user device 102. The collected usage analytics may include usage of the application by users of the user device 102, interfacing of the application with the user device 102, and details regarding user device 102. Usage analytics unit 506 also collects user feedback from a user of user device 102. All usage analytics received, as well as any other data transmitted to/from server 104 may be stored in a storage 510. Usage analytics for particular users may be added to internal user profiles corresponding to the users.

Developer dashboard unit 508 may provide an interface to a developer. The interface may be a developer dashboard which provides the usage analytics to the developer for viewing and further analysis. The developer dashboard may format the usage analytics for display in a graphical form and present them for display.

Additionally, developer dashboard unit 508 may interface with usage analytics unit 506. In this manner, through the developer dashboard, a developer 108 may determine specific metrics to be recorded with respect to a particular user. For example, developer 108 may dictate that each time an in-application purchase is made, where a purchase or transaction is enacted from within the application, information regarding the purchase will be collected and stored in correspondence with the user's internal user profile.

The developer dashboard allows developers to view different analytics as well as specific internal user profiles of users using their application. For example, when a developer wishes to view user feedback, a display provided by the developer dashboard may be augmented with additional information regarding the user stored in the internal user profile.

Figure 6A:
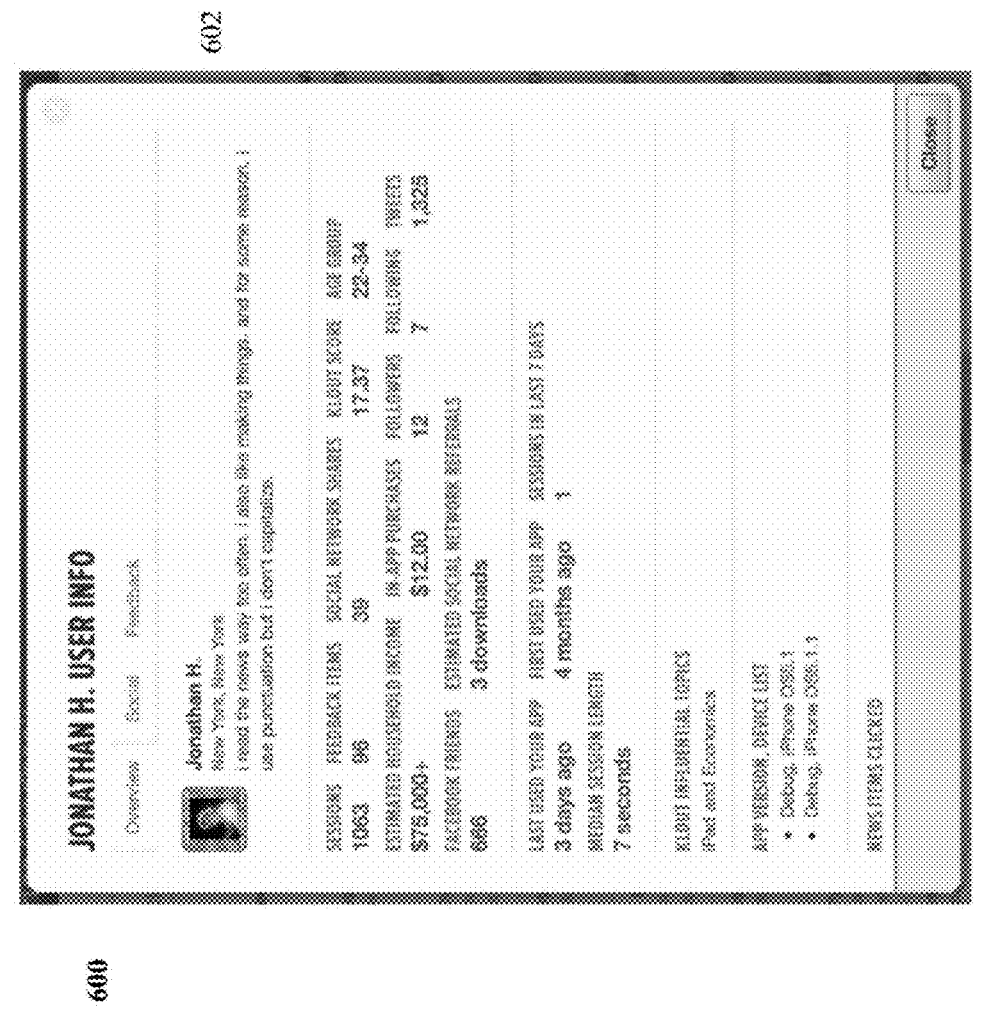

FIG. 6A depicts an exemplary display of a developer dashboard display, in accordance with an embodiment of the present disclosure. Display 600 shows a user information overview section 602. Section 602 displays information about the user such as their geographic location, how many sessions they have initiated for the particular application relating to the feedback, the number of feedback items, number of social network shares and referrals, information regarding purchases or transactions enacted from within the application, as well as demographic information such as age group and estimated household income.

Figure 6B:
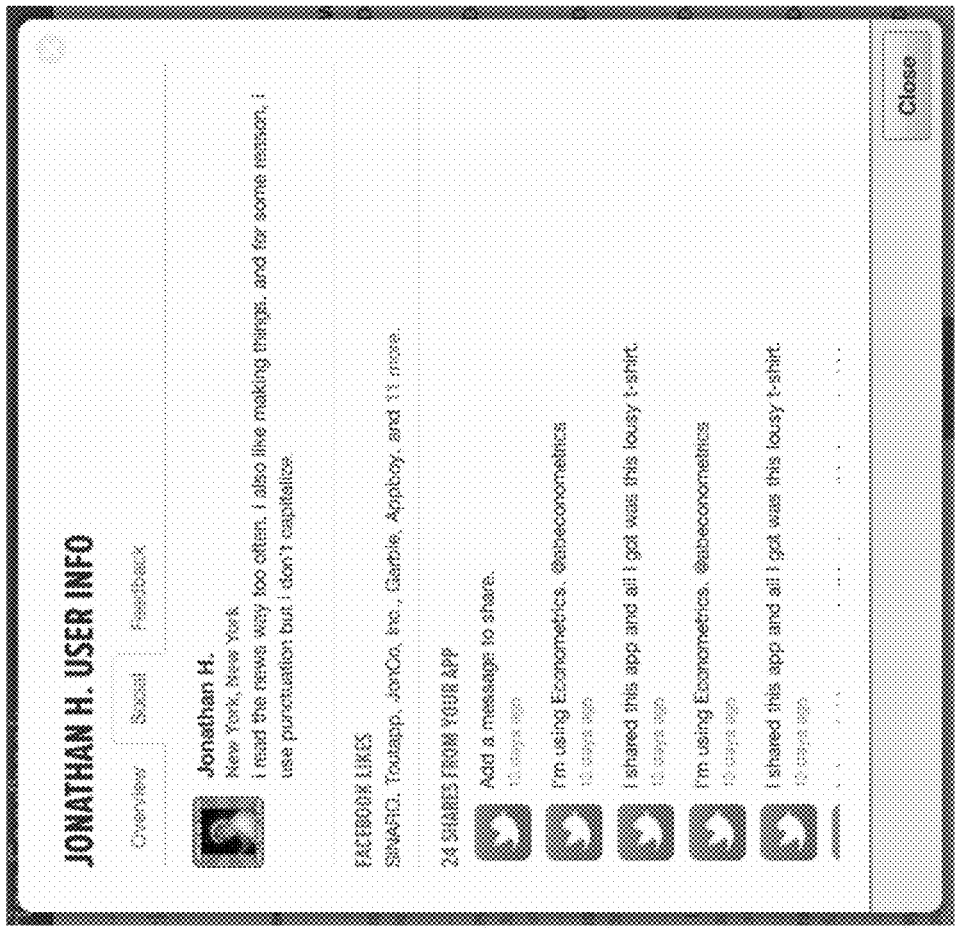

FIG. 6B depicts an exemplary display of a developer dashboard display, in accordance with an embodiment of the present disclosure. Display 610 shows a user information social section 612. Section 612 displays information related to the user's social networks. For example, the user's likes or posts from Facebook may be shown to ascertain information about the user's interests. Similarly, shares related to the application made on Twitter, can also be shown so the developer may see when and how the user is using the application. The developer may also see either positive or negative feedback from the tweets or shares from the Twitter account.

Figure 6C:
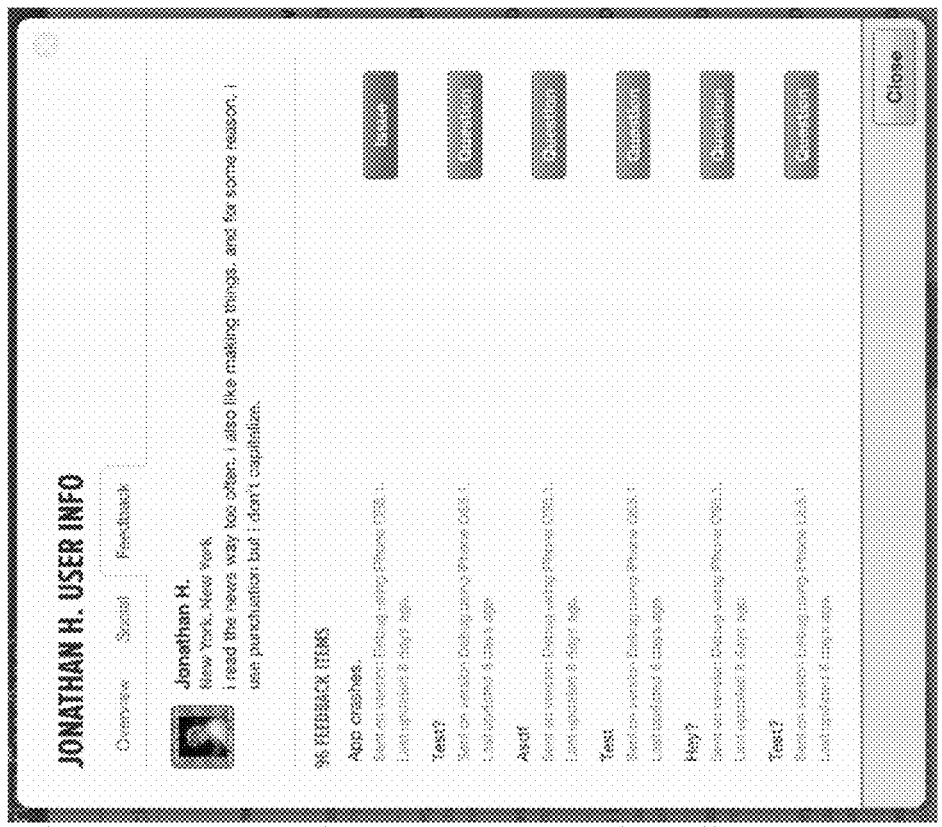

FIG. 6C depicts an exemplary display of a developer dashboard display, in accordance with an embodiment of the present disclosure. Display 620 shows a user information feedback section 622. Feedback section 622 shows user feedback that has been submitted through the application and to server 104. The user feedback may be displayed in list form, where a developer may select an icon associated with each feedback item in order to address the feedback by, for example, responding to the user.

Figure 6D:
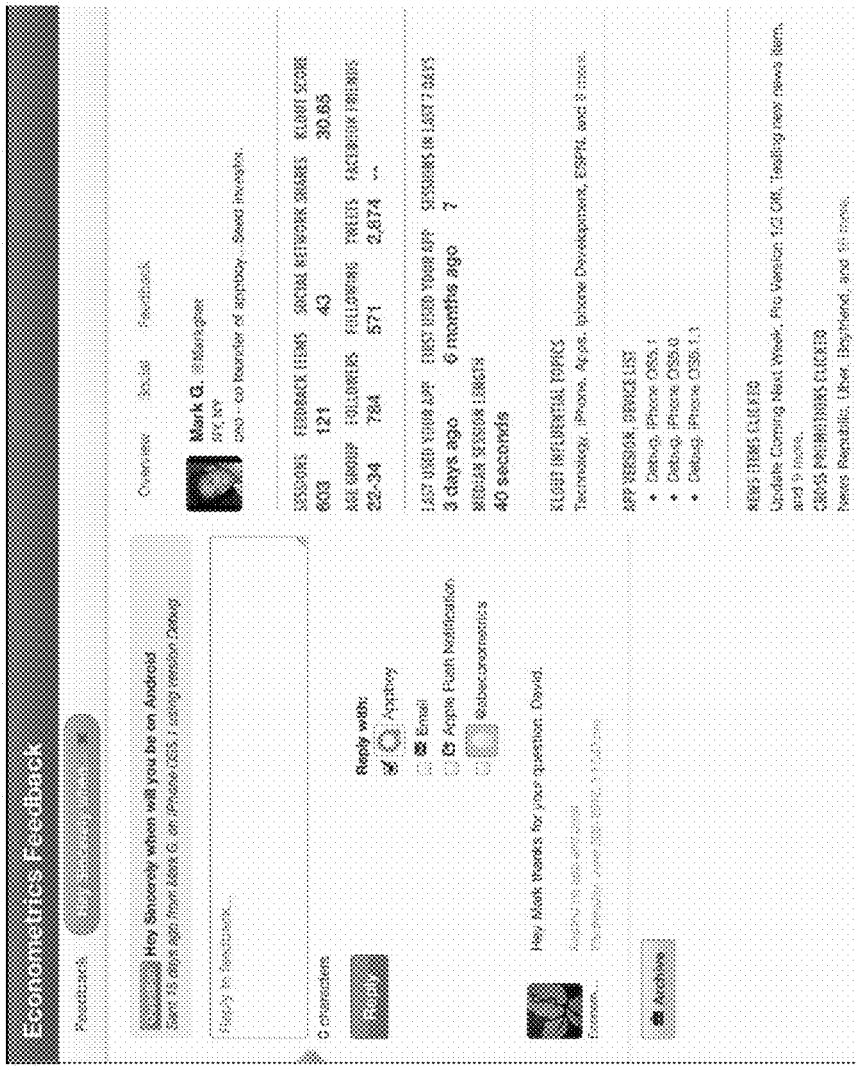

FIG. 6D depicts an exemplary display of a developer dashboard display, in accordance with an embodiment of the present disclosure. Display 230 shows information after selection of an icon associated with a feedback item. The developer may reply to the feedback, and can choose various methods of replying, either via a developer account, via the application, or via a social network or external account. Additional information such as when the application was used, details about the user device used to execute the application, and application version may also be listed. From this display (and all of the displays shown by FIGS. 6A-6D), a developer can not only address feedback information, but also ascertain valuable information regarding the user's usage of the application as well as ancillary information which may be useful for the developer in improving the current application or developing new applications.

Figure 7A:
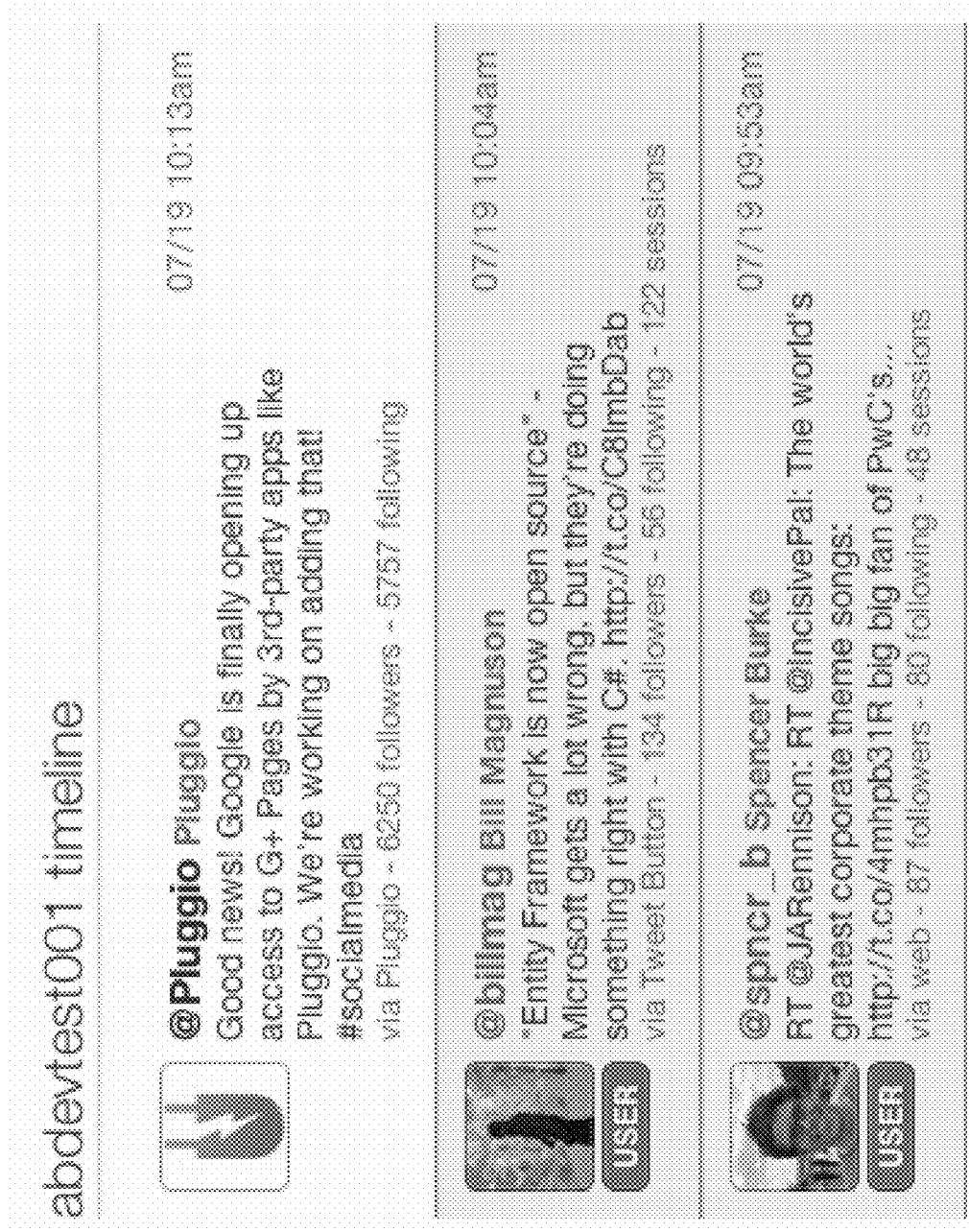
FIGS. 7A and 7B depict exemplary displays showing developer social network augmentation, in accordance with an embodiment of the present disclosure.
Figure 7B:
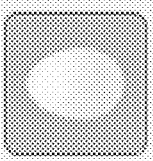

FIGS. 7A and 7B depict exemplary displays showing developer social network augmentation, in accordance with an embodiment of the present disclosure. Developers may, through the developer dashboard, associate their own social network or external accounts with their developer dashboard. For example, a developer may associate their Facebook or Twitter credentials to an account associated with the developer dashboard. As a result, the developer dashboard may provide a display of user information alongside a developer's social network information. FIG. 7A, for example, depicts a Twitter timeline including entries related to users of a developer's applications. Selection of any of the users will result in a display of an internal user profile similar to that shown with regard to FIG. 6. FIG. 7B similarly displays entries related to an application developed by the developer.

FIG. 8 depicts an exemplary graph that may be presented through the developer dashboard, in accordance with an embodiment of the present disclosure. Application usage analytics collected by server 104 may be combined and correlated with events that occur on a developer's social network. Thus, the developer dashboard can show the developer information such as a correlation between user growth for an application and events on a developer social network. Graph 800 presents a graph of users over time, and displays a spike 802 that is associated with an event 804 showing that a developer posted a discount announcement for the application to a social networking account, such as Facebook.

Figure 9:
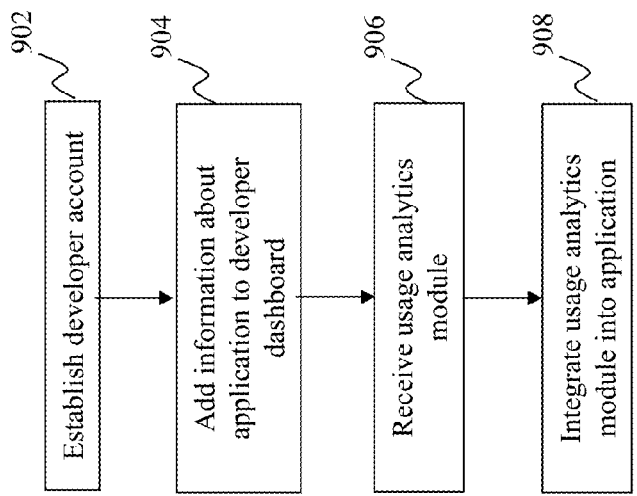
FIG. 9 depicts an exemplary process for a developer to establish access to a developer dashboard and integrate a usage analytics module with their application, in accordance with an embodiment of the present disclosure.

FIG. 9 depicts an exemplary process for a developer to establish access to a developer dashboard and integrate a usage analytics module with their application, in accordance with an embodiment of the present disclosure. At 902, a developer 108 may establish a developer account at server 104 by accessing server 104. The developer account will thereby allow developer 108 to access a developer dashboard through server 104.

At 904, developer 108 may log into their developer dashboard through server 104 and add information about their application to the developer dashboard. The developer may also add their own social network accounts or external accounts to the developer dashboard, such that this information is displayable and accessible through the developer dashboard.

At 906, server 104, through the developer dashboard, may provide the usage analytics module to developer 108, and thus developer 108 receives the usage analytics module from server 104.

At 908, developer 108 may integrate the usage analytics module into an application either through server 104, or by downloading the usage analytics module and performing the integration through a machine used by developer 108.

Figure 10:
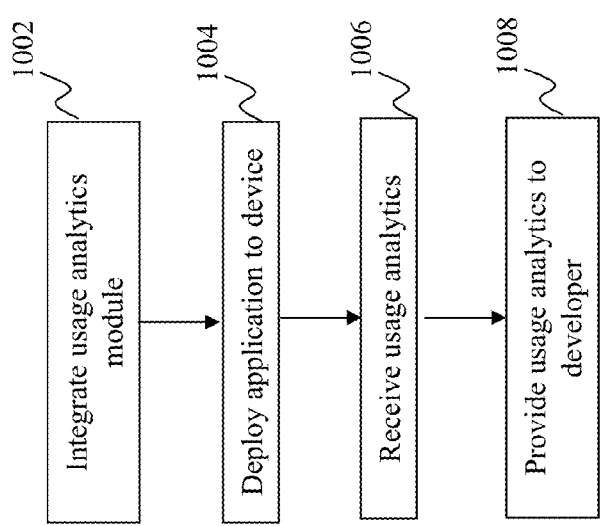
FIG. 10 depicts an exemplary process for analyzing application usage, in accordance with an embodiment of the present disclosure.

FIG. 10 depicts an exemplary process for analyzing application usage, in accordance with an embodiment of the present disclosure. At 1002, the usage analytics module is integrated with an application. At 1004, the application is deployed to a device, such as a mobile phone. After deployment of the application, a user of user device 102 may download the application. When the user uses the application, usage analytics are collected which are transmitted to server 104. At 1006, usage analytics are collected and received by server 104 in response to usage of the application at the device. At 1008, the usage analytics are provided to the developer. Provision of the usage analytics as described above, may be through a developer dashboard. The developer dashboard may also include information about the social network accounts or external accounts of the developer, since this information may be input by the developer when first establishing their account with the developer dashboard.

Figure 11:
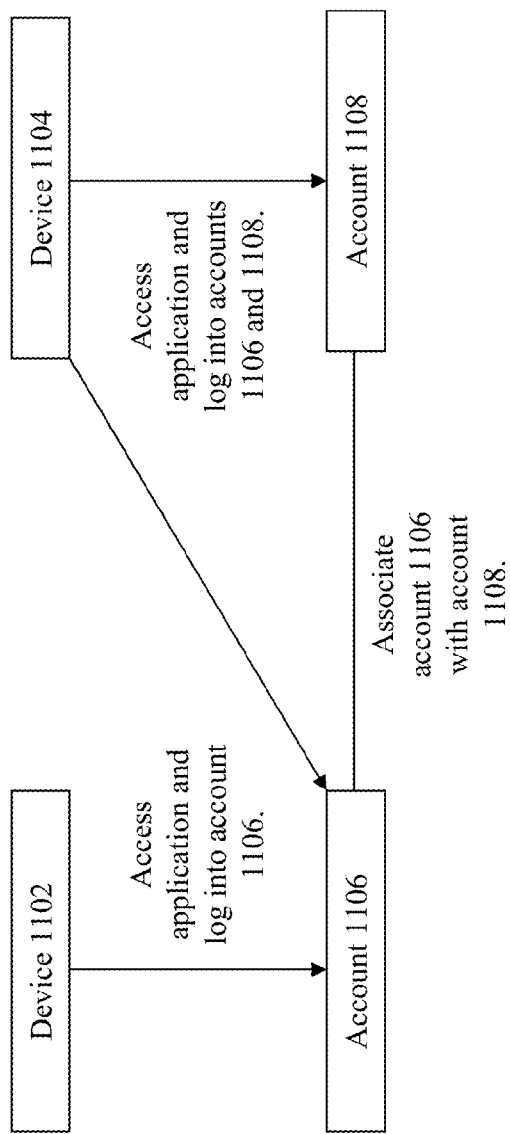
FIG. 11 depicts an exemplary deduplication of data for social network or external account identities of users, in accordance with an embodiment of the present disclosure.

FIG. 11 depicts an exemplary deduplication of data for social network or external account identities of users, in accordance with an embodiment of the present disclosure. Identity keys, as described above, are used as identifiers to associate a particular user with other social network or external accounts. Identity keys may be utilized in the deduplication of data for social network identities. For example, a single user may use two different devices to run the same application. However, server 104 will initially assume that the user of these two different devices are different people.

Two devices 1102 and 1104 may belong to and be used by a single user. That user may install the same application including an integrated usage analytics module onto both device 1102 and 1104. Since an internal user profile is created at server 104 for usage of the application at each device, server 104 does not know that the user of device 1102 and 1104 is in reality the same entity.

However, if a user decides to link a social network account or external account (account 1106) to the application at device 1102, server 104 will thereafter have the identity key of the user with respect to account 1106. Thus, if the user links account 1106 to their other device 1104, server 104 will detect that account 1106 linked to both device 1102 and device 1104 have the same identity key and thus are associated with the same user. As a result, usage analytics data collected from both device 1102 and 1104 may be aggregated in the same internal user profile stored at server 104.

Additionally, if the user decides to use device 1104 to link the application to another account 1108, server 104 may further identify account 1108 as belonging to the same user, and also link account 1108 to the internal user profile, based on the identity key of account 1106 of the user and the association of device 1102 and 1104. Thus, the internal user profile may now aggregate data from both devices 1102 and 1104, as well as both accounts 1106 and 1108 of the user.

For example, device 1102 may be a mobile phone and device 1104 may be a tablet computing device. Device 1102 and device 1104 are both used by the same user. The user may install the same application on both device 1102 and device 1104 to submit feedback through an integrated usage analytics module of the application to server 104. Server 104 treats these two devices as belonging to different users and thus creates two discrete internal user profiles. The user may link their Facebook account (account 1106) with the application at device 1102. Linkage causes an identity key associated with the Facebook account of the user to be transmitted to server 104 such that server 104 may aggregate information from the Facebook account to the user's internal user profile. The user may then link their Facebook account (account 1106) with the application at device 1104. Since account 1106 shares a single identity key, but which has now been detected from two different devices 1102 and 1104, server 104 may deduplicate the social identities by detecting that usage of the application at both device 1102 and 1104 is associated with the same account 1106. Thus, all data relating to application usage at device 1102 and 1104, as well as further additional information from account 1106, may be aggregated and merged by server 104 into the user's internal user profile. Thus, the deduplication of data has occurred based on login and association of the same social network account with two different devices using the same application.

Additionally, if another social network account or external account (account 1108) were linked to the application from device 1104, for example, server 104 would further associate the identity key of account 1108 with the identity key of account 1106. Thus, server 104 now identifies the user of device 1102 and device 1104, and accounts 1106 and 1108 as all belonging to the same entity. Thus, any data such as usage analytics data from device 1102 and device 1104, collected by the integrated usage analytics module of the application at either device, and details from accounts 1106 and account 1108 may all be aggregated at an internal user profile of the user. The aggregation may be particularly useful to a developer who may now access more information about the user.

Figure 12:
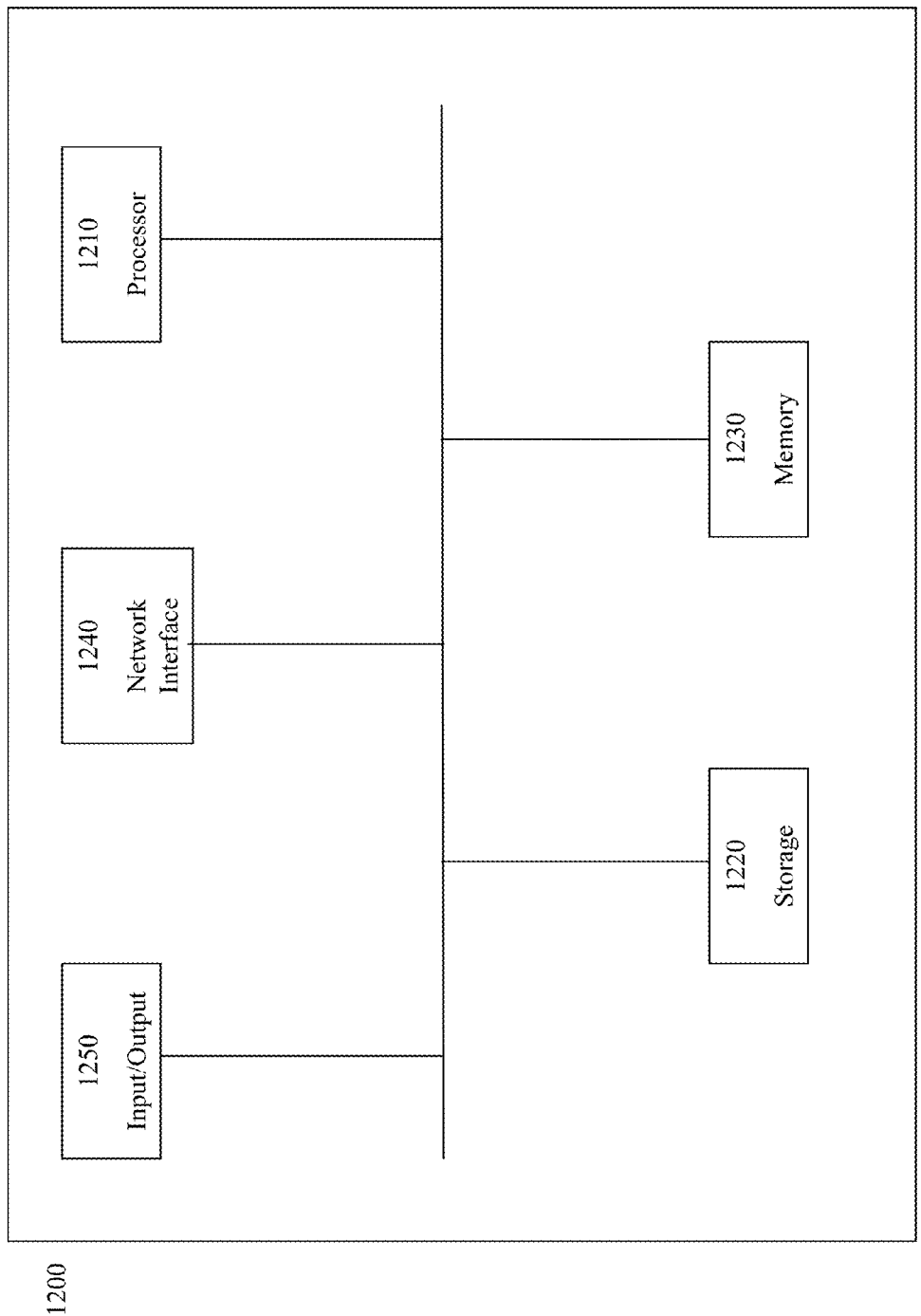
FIG. 12 depicts a general machine architecture on which the present embodiments can be implemented and has a functional block diagram illustration of a hardware platform which includes user interface elements.

The above-described embodiments for collecting and analyzing application usage can be implemented on a computer using well-known computer processors, memory units, storage devices, computer software, and other components. A high-level block diagram of such a computer is illustrated in FIG. 12. Computer 1200 contains a processor 1210, which controls the overall operation of the computer 1200 by executing computer program instructions, which define such operations. The computer program instructions may be stored in a storage device 1220, or other computer readable medium (e.g., magnetic disk, CD ROM, etc.), and loaded into memory 1230 when execution of the computer program instructions is desired. Thus, any of the processes described herein can be defined by the computer program instructions stored in the memory 1230 and/or storage 1220 and controlled by the processor 1210 executing the computer program instructions. For example, the computer program instructions can be implemented as computer executable code programmed by one skilled in the art to perform collection and analysis of application usage. Accordingly, by executing the computer program instructions, the processor 1210 executes an algorithm for collecting and analyzing application usage as described herein. Computer 1200 may also perform other functionalities, such as those described above in connection with all Figures corresponding to the embodiments described herein. The computer 1200 also includes one or more network interfaces 1240 for communicating with other devices via a network. The computer 1200 also includes input/output devices 1250 that enable user interaction with the computer 1200 (e.g., display, keyboard, mouse, speakers, buttons, etc.) One skilled in the art will recognize that an implementation of an actual computer could contain other components as well, and that FIG. 12 is a high level representation of some of the components of such a computer for illustrative purposes.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim and all applications, modifications and variations that fall within the true scope of the present teachings.

The invention claimed is:

1. A method comprising:
receiving, by a server, a first identity key from a first client running a first application comprising a first application usage analytics instruction set integrated therewith, wherein the first identity key corresponds to a service account, wherein the first application is linked to the service account via the first application usage analytics instruction set based on the first identity key;
associating, by the server, the first identity key with a profile such that the profile is related with the service account, wherein the profile is stored in a database accessible to the server;
receiving, by the server, a second identity key from a second client running a second application comprising a second application usage analytics instruction set integrated therewith, wherein the second identity key corresponds to the service account, wherein the second application is linked to the service account via the second application usage analytics instruction set based on the second identity key;
associating, by the server, the second identity key with the profile such that the profile is related with the service account; and
de-duplicating, by the server, the first identity key and the second identity key based on an analysis of a usage of the first application and the second application, wherein the analysis is based on the first application usage analytics instruction set and the second application usage analytics instruction set;
generating, by the server, usage analytics data corresponding to the analysis of the usage of the first application and the second application; and
providing, by the server, the usage analytics data to a developer computer through a developer dashboard, the developer dashboard providing a display of the usage analytics data alongside a display of social network information.

2. The method of claim 1, wherein the de-duplicating comprises comparing the first identity key to the second identity key.

3. The method of claim 1, wherein at least one of the first application usage analytics instruction set and the second application usage analytics instruction set is integrated into a source code of at least one of the first application or the second application.

4. The method of claim 1, further comprising sending, by the server, the analysis to a third client.

5. The method of claim 1, wherein the first application and the second application are functionally equivalent.

6. The method of claim 1, wherein the first application usage analytics instruction set and the second application usage analytics instruction set are functionally identical.

7. The method of claim 1, wherein the second application usage analytics instruction set is a copy of the first application usage analytics instruction set.

8. The method of claim 1, wherein the server receives the analysis from at least one of the first application usage analytics instruction set or the second application usage analytics instruction set responsive to the usage of at least one of the first application on the first client and the second application on the second client, wherein the server correlates the analysis to the profile.

9. The method of claim 1, further comprising performing, by the server, the analysis.

10. The method of claim 1, wherein the analysis is based on collecting data from a user of at least one of the first client or the second client via at least one of the first application usage analytics instruction set or the second application usage analytics instruction set.

11. The method of claim 1, wherein at least one of the first application or the second application is configured to display a first graphical user interface, wherein at least one of the first application usage analytics instruction set or the second application usage analytics instruction set is configured to facilitate at least one of pushing or pulling at least one of content and communications to a user via the software application and display the at least one content and communications on a page of a second graphical user interface, wherein the set of instructions is configured to facilitate the collection of data from a user of at least one of the first application or the second application, wherein at least one of the first application usage analytics instruction set or the second application usage analytics instruction set is configured to add information regarding the data received from the user to a user profile stored in a database, wherein the database is remote from at least one of the first client or the second client.

12. The method of claim 11, wherein the at least one content and communications is configured to be presented when at least one of the first application or the second application is initiated.

13. The method of claim 11, wherein the at least one content and communications is received from a social network service.

14. The method of claim 11, wherein the at least one content and communications is received from an email service associated with the user of at least one of the first application or the second application.

15. The method of claim 1, further comprising monitoring, by the server, a follow-on activity via at least one of the first application usage analytics instruction set or the second application usage analytics instruction set.

* * * * *